US010939355B2

(12) United States Patent
Kinugawa et al.

(10) Patent No.: US 10,939,355 B2
(45) Date of Patent: Mar. 2, 2021

(54) COMMUNICATION DEVICE FOR WORKING MACHINE, MOBILE TERMINAL, COMMUNICATION SYSTEM FOR WORKING MACHINE, AND COMMUNICATION PROCESSING METHOD FOR WORKING MACHINE

(71) Applicant: KUBOTA CORPORATION, Osaka (JP)

(72) Inventors: Ryosuke Kinugawa, Osaka (JP); Keisuke Egashira, Osaka (JP); Keisuke Miura, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 16/225,710

(22) Filed: Dec. 19, 2018

(65) Prior Publication Data

US 2019/0200277 A1 Jun. 27, 2019

(30) Foreign Application Priority Data

Dec. 21, 2017 (JP) .............................. JP2017-245210

(51) Int. Cl.
*H04W 4/80* (2018.01)
*H04W 40/24* (2009.01)
*H04W 76/10* (2018.01)
*H04L 12/28* (2006.01)
*H04L 9/32* (2006.01)
*H04W 88/02* (2009.01)
(Continued)

(52) U.S. Cl.
CPC ......... *H04W 40/244* (2013.01); *H04L 67/125* (2013.01); *H04L 67/16* (2013.01); *H04W 4/40* (2018.02); *H04W 12/1206* (2019.01); *H04W 88/02* (2013.01); *H04L 67/12* (2013.01); *H04W 4/80* (2018.02); *H04W 48/12* (2013.01)

(58) Field of Classification Search
CPC ........ H04L 67/125; H04W 4/00; H04W 76/11
USPC ............................................... 455/404.1, 411
See application file for complete search history.

(56) References Cited

U.S. PATENT DOCUMENTS 9,363,318 B2* 6/2016 Nelson ................... H04L 67/125
2004/0229598 A1* 11/2004 Tajima ................... G01C 21/26
455/414.1

(Continued)

FOREIGN PATENT DOCUMENTS

JP 2008 220337 A 9/2008
JP 2014 43792 A 3/2014
(Continued)

*Primary Examiner* — Asad M Nawaz
*Assistant Examiner* — Jason A Harley
(74) *Attorney, Agent, or Firm* — Greenblum & Bernstein, P.L.C.

(57) ABSTRACT

A communication system for a working machine includes a communication device disposed on the working machine, and a mobile terminal to be connected to the communication device, the mobile terminal having a first application and a second application. The communication device has a first communication circuit to transmit, to the mobile terminal, a beacon including a first application identifier corresponding to the first application, and a second application identifier corresponding to the second application. And, the mobile terminal has a calculation circuit to execute the second application after the first application is activated.

12 Claims, 5 Drawing Sheets

(51) Int. Cl.
   *H04L 29/08*  (2006.01)
   *H04W 4/40*   (2018.01)
   *H04W 12/12*  (2021.01)
   *H04W 48/12*  (2009.01)

(56) References Cited

U.S. PATENT DOCUMENTS

| | | | |
|---|---|---|---|
| 2007/0203972 A1* | 8/2007 | Wewalaarachchi | H04L 29/06 709/202 |
| 2008/0298375 A1* | 12/2008 | Agardh | H04L 63/104 370/397 |
| 2010/0091698 A1* | 4/2010 | Aibara | H04W 52/0216 370/315 |
| 2016/0165056 A1* | 6/2016 | Bargetzi | G06Q 10/1095 455/416 |
| 2016/0180345 A1* | 6/2016 | Canpolat | G06Q 30/00 705/26.1 |
| 2017/0201520 A1* | 7/2017 | Chandoor | H04L 63/108 |
| 2018/0255150 A1* | 9/2018 | Williams | H04L 41/12 |

FOREIGN PATENT DOCUMENTS

| | | |
|---|---|---|
| JP | 2017 209032 A | 11/2017 |
| WO | 2017 149585 A1 | 9/2017 |

\* cited by examiner

FIG.3

| Application identifier | | Application software |
|---|---|---|
| 1st application identifier | 5A3D | 1st application |
| 2nd application identifier | 5A3E | 2nd application |
| . . . | . . . | . . . |

# COMMUNICATION DEVICE FOR WORKING MACHINE, MOBILE TERMINAL, COMMUNICATION SYSTEM FOR WORKING MACHINE, AND COMMUNICATION PROCESSING METHOD FOR WORKING MACHINE

CROSS-REFERENCE TO RELATED APPLICATIONS

The present application claims priority under 35 U.S.C. § 119 to Japanese Patent Application No. 2017-245210, filed Dec. 21, 2017. The content of this application is incorporated herein by reference in their entirety.

BACKGROUND OF THE INVENTION

Field of the Invention

The present invention relates to a communication device for a working machine, a mobile terminal, a communication system for the working machine, and a communication processing method for the working machine.

Description of Related Art

U.S. Pat. No. 9,363,318 is previously known as a technique for performing communication between a vehicle and a mobile terminal. In U.S. Pat. No. 9,363,318, an application identifier used for identifying an application is transmitted from the vehicle computer side to the mobile terminal, and the mobile terminal that has received the application identifier determines an application corresponding to the application identifier, then after activating the application, the mobile terminal side transmits data relating to the application to the vehicle computer.

SUMMARY OF THE INVENTION

A communication device for a working machine to be connected to a mobile terminal having at least a first application and a second application, includes a first communication circuit including a first application identifier corresponding to the first application, and a second application identifier corresponding to the second application.

A mobile terminal having at least a first application and a second application and being configured to be connected to a communication device disposed on a working machine, includes a calculation circuit to activate the first application after receiving of the first application identifier and the second application identifier transmitted by the communication device and then to activate the second application corresponding to the second application identifier.

A communication system for a working machine includes a communication device disposed on the working machine, and a mobile terminal to be connected to the communication device, the mobile terminal having a first application and a second application. The communication device has a first communication circuit to transmit, to the mobile terminal, a beacon including a first application identifier corresponding to the first application, and a second application identifier corresponding to the second application. And, the mobile terminal has a calculation circuit to execute the second application after the first application is activated.

A communication processing method for a working machine in which connection between a communication device disposed on the working machine and a mobile terminal is established, the mobile terminal having a first application and a second application, includes transmitting by the communication device, to the mobile terminal, a beacon including a first application identifier corresponding to the first application, and a second application identifier corresponding to the second application, activating, by the mobile terminal, the first application after receiving the beacon, and executing the second application after the first application is activated.

DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 3 is a view illustrating a relation between a plurality of applications and an application identifier according to the embodiment;

DESCRIPTION OF THE EMBODIMENTS

Figure 1:
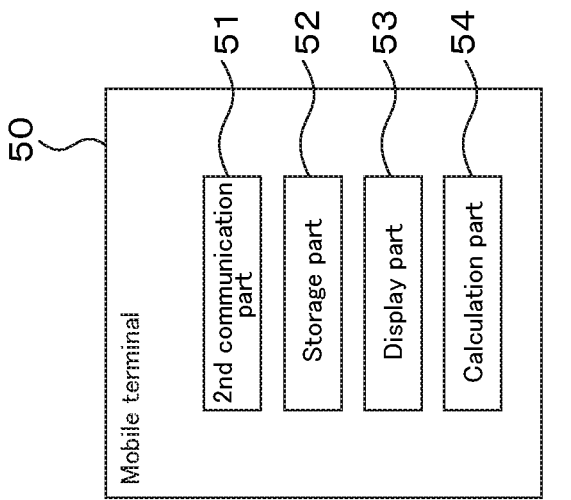
FIG. 1 is a schematic view illustrating a data communication system for a working machine according to an embodiment of the present invention.
Figure 1:
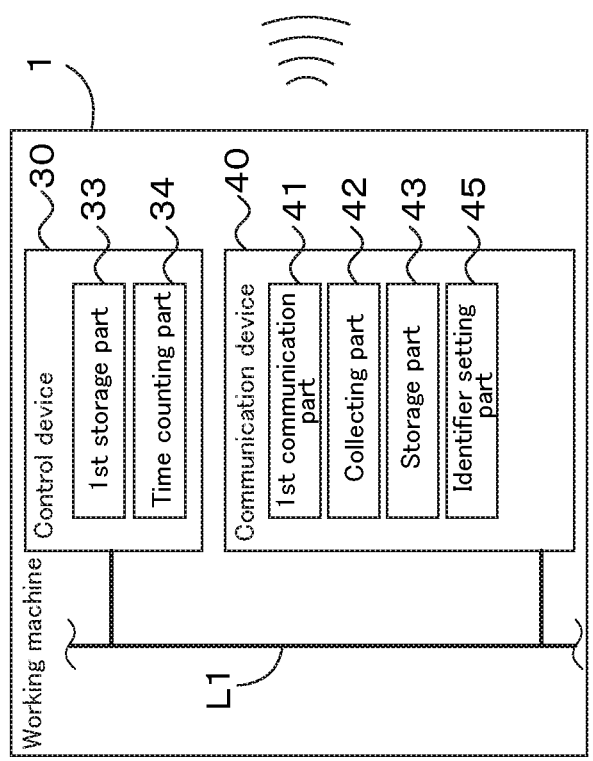

The embodiments will now be described with reference to the accompanying drawings, wherein like reference numerals designate corresponding or identical elements throughout the various drawings. The drawings are to be viewed in an orientation in which the reference numerals are viewed correctly.

Hereinafter, embodiments of the present invention will be described with reference to the drawings as appropriate.

Figure 5:
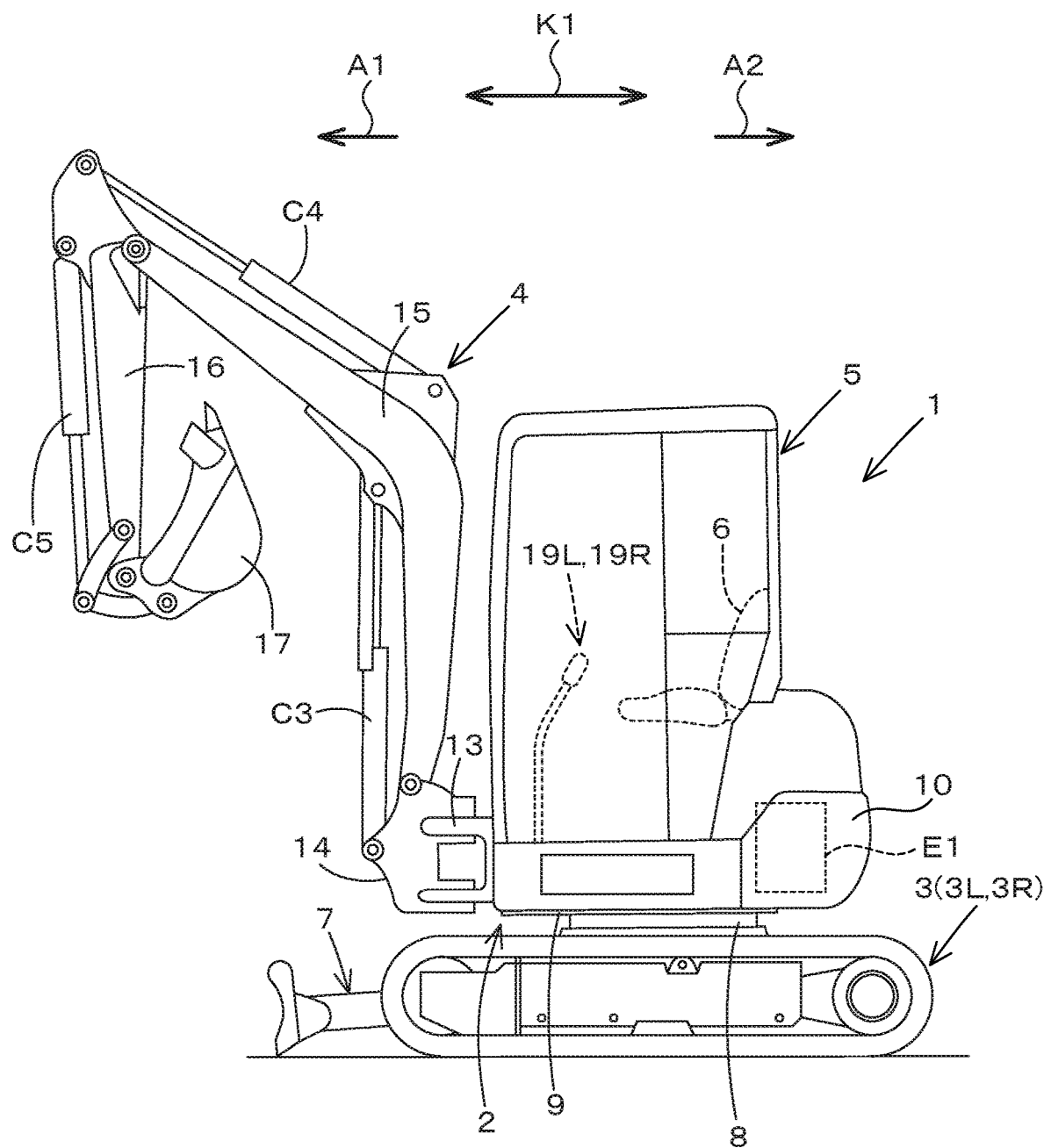
FIG. 5 is a schematic view illustrating a side view of a working machine according to the embodiment.

FIG. 5 is a schematic view showing a side surface of the overall configuration of the working machine 1 according to the present embodiment. In the present embodiment, a backhoe which is a swiveling working machine is exemplified as the working machine 1.

In this embodiment, although a backhoe is exemplified as the working machine 1, the working machine may be an agricultural machine such as a tractor, a combine, and a rice transplanter, a compact track loader, a skid steer loader, or the like.

The overall configuration of the working machine 1 will be described at first.

As shown in FIG. 5, the working machine 1 includes a machine body 2, a traveling device 3, and a work device 4. A cabin 5 is mounted on the machine body 2. An operator seat 6 is provided in the interior of the cabin 5.

In this embodiment, the front side of a driver (the operator) seated on the operator seat of the working machine 1 (the direction indicated by an arrowed line A1 in FIG. 5) is defined as the front, the rear side of the operator (the direction indicated by an arrowed line A2 in FIG. 5) is defined as the rear, the left side of the operator (on the front surface side of FIG. 5) is defined as the left, and the right side of the operator (on the back surface side of FIG. 5) is defined as the right.

In addition, the horizontal direction which is a direction orthogonal to the front-back direction K1 is referred to as the machine width direction in the explanation. The direction from the center portion of the machine body 2 toward the right portion in the width direction of the machine body 2 will be referred to as a machine outward direction, and the direction from the center portion of the machine body 2 toward the left portion in the width direction of the machine body 2 also will be referred to as the machine outward direction. In other words, the machine outward direction is equivalent to the machine width direction, and means a direction separating away from the center of the machine body 2 in the machine width direction.

The following explanation will be made defining a direction opposite to the machine outward direction as the machine inward direction. In other words, the machine inward direction is equivalent to the machine width direction, and means a direction approaching the center of the machine body 2 in the machine width direction.

As shown in FIG. 5, the traveling device 3 includes a traveling body 3L and a traveling body 3R, the traveling body 3L is provided on the left side, and the traveling body 3R is provided on the right side. The traveling body 3L and the traveling body 3R are each constituted of crawler type traveling devices.

A dozer device 7 is attached to the front portion of the traveling device 3. The dozer device 7 is configured to be vertically move (raise and lower the blade) by the strand the likening and shortening of the dozer cylinder.

The machine body 2 is a turn base (a swiveling base), and is supported on the traveling device 3 so as to be freely turned about a longitudinal axis (an axis extending in the vertical direction) via a turn bearing 8. The machine body 2 is configured to be pivotally driven by a turn motor consisting of a hydraulic motor (a hydraulic actuator). The machine body 2 has a weight 10 and a turn base plate 9 configured to turn about the vertical axis.

The turn base plate 9 is formed of a steel plate or the like, and is connected to the turn bearing 8. The weight 10 is provided at the rear portion of the machine body 2. A prime mover E1 is mounted on the rear portion of the machine body 2. The prime mover E1 is a diesel engine.

Meanwhile, the prime mover E1 may be an electric motor or may be a hybrid type having the diesel engine and the electric motor.

The machine body 2 has a support bracket 13 at the center of the front portion of the machine body 2 in the machine width direction, being arranged slightly rightward. A swing bracket 14 is attached to the support bracket 13 so as to be swingable about the longitudinal axis. A working device 4 is attached to the swing bracket 14.

As shown in FIG. 5, the working device 4 has a boom 15, an arm 16, and a bucket (a working tool) 17. The base portion of the boom 15 is pivotally attached to the swing bracket 14 so as to be rotatable about a horizontal axis (an axis extending in the machine width direction). In this manner, the boom 15 is configured to be freely swung upward and downward.

The arm 16 is pivotally attached to the tip end side of the boom 15 so as to be rotatable about the horizontal axis. In this manner, the arm 16 is configured to be freely swung forward and backward or upward and downward. The bucket 17 is provided on the tip end side of the arm 16 so as to perform the shoveling operation and the dumping operation.

Instead of or in addition to the bucket 17, it is possible for the working tool 1 to mount another working tool (an auxiliary attachment) that is configured to be driven by a hydraulic actuator. Examples of other working tools (the auxiliary attachments) include a hydraulic breaker, a hydraulic crusher, an angle bloom, a ground auger, a pallet fork, a sweeper, a mower, a snow blower, and the like.

The swing bracket 14 is configured to be swung by the strand the likening and shortening of a swing cylinder that is provided in the machine body 2. The boom 15 is configured to be swung by the strand the likening and shortening of the boom cylinder C3.

The arm 16 is configured to be swung by the strand the likening and shortening of the arm cylinder C4. The bucket 17 is configured to freely perform the shoveling performance and the dumping operation due to the strand the likening and shortening of the buckand the likeylinder (the working tool cylinder) C5.

Each of the dozer cylinder, the swing cylinder, the boom cylinder C3, the arm cylinder C4, and the buckand the likeylinder C5 is constituted of a hydraulic cylinder (a hydraulic actuator). As shown in the drawings, an operation device 19L is provided on the left side of the operator seat 6 in the cabin 5, and an operation device 19R is provided on the right side of the operator seat 6.

As shown in FIG. 1, the working machine 1 has a control device 30. The control device 30 is a device configured to perform the control relating to the working machine 1, and performs various controls such as, for example, the hydraulic control, the automatic idle control (the AI control), the boom height control, the arm height control, and the anti-theft control.

Various sensors are connected to the control device 30, and the values (the signals) detected by the sensors are inputted to the control device 30.

For example, an operation amount of the operation device (the operation device 19L, the operation device 19R) detected by a position sensor or the like, a governor angle (a governor position) detected by a governor sensor, an operation amount of the accelerator detected by a position sensor or the like, an engine revolution speed detected by the revolution sensor or the like, and an angle of the arm and an angle of the boom detected by the angle sensor or the like are inputted to the control device 30.

In the hydraulic control, the control device 30 outputs a control signal to the proportional solenoid valve or the like in accordance with the operation amounts of the operation devices 19L and 19R, and sets the opening degree of the proportional solenoid valve and thereby controls a flow rate control valve connected to the proportional solenoid valve.

That is, in the hydraulic control, the flow rate control valve configured to control the hydraulic actuators (the swing cylinder, the boom cylinder C3, the arm cylinder C4, and the buckand the likeylinder) are controlled.

In the automatic idle control, when the control devices 19L and 19R are operated, the control device 30 outputs, to the engine, the control signal corresponding to the operation amount of the accelerator, and thereby increases and decreases the engine revolution speed. When the operation controllers 19L and 19R are not operated, the control device 30 outputs, to the engine, a control signal indicating the idling revolution speed is outputted to the engine, and thereby fixes the engine revolution speed to the idling state.

In the boom height control, when the height of the boom 15 reaches the upper limit value of the boom height preliminarily set in the boom height control, the control device 30 stops the upward moving of the boom 15 irrespective of the operations of the control devices 19L and 19R.

That is, in the boom height control, when the boom angle at the time of upward moving operation of the boom 15 reaches the upper limit value, the flow rate control valve corresponding to the boom cylinder C3 is controlled, and thereby the upward moving of the boom 15 is stopped.

In the angle control of the arm, when the angle of arm reaches the upper limit value or the lower limit value of the angle of arm angle (the arm angle) preliminarily set, the control device 30 controls the arm 16 to stop the scraping operation irrespective of the operations of the operation devices 19L and 19R.

That is, in the arm angle control, when the arm angle at the time of the scraping operation of the arm 16 reaches the upper limit value or the lower limit value, the control device 30 controls the flow rate control valve corresponding to the arm cylinder C4, and thereby stops the scraping operation of the arm 16.

In the anti-theft control, when authentication between the authentication information registered in advance (the second authentication information) and the authentication information (the first authentication information) transmitted from the outside such as the mobile terminal 50 is established, the control device 30 provides permission to start the prime mover E1 (the engine), and thereby drives the engine.

In addition, in the anti-theft control, when the authentication between the first authentication information and the second authentication information is not established, the control device 30 does not provide the permission of the engine start, and thereby does not start the engine.

As described above, the control device 30 is configured to perform various controls such as the hydraulic control, the automatic idle control (the AI control), the boom height control, the arm height control, the anti-theft control, and the like. Meanwhile, the controls described above are just the examples and are not limited, and the control device 30 executes necessary controls in accordance with to the modes of the working machine 1.

The control device 30 has a storage part (a storage device) 33 and a time counting part 34. The time counting part 34 is constituted of electric/electronic parts provided in the control device 30, programs stored in the control device 30, or the like. The time counting part 34 counts the operation time until the input of the engine revolution speed to the control device 30 is terminated from the time of starting to input, to the control device 30, the engine revolution speed detected by the engine rotation sensor (start of driving) until the engine revolution speed reaches the control device 30.

In other words, the time counting part 34 obtains, by a timer or the like, the time (the elapsed time) during which the engine is driven. For example, when the engine is driven continuously from 9 o'clock to 12 o'clock, the operation time (the elapsed time) is 3 hours. The time counting part 34 obtains the accumulated operation time (the hour meter) by accumulating the counted operation time every time when the engine is driven (from the start of driving the engine to the end of driving the engine).

In this embodiment, the accumulated value of the operation time from the start of driving the engine to the end of driving the engine is set as the accumulated operation time. However, the time during which the driven parts other than the engine is driven may be employed as the accumulated operation time (the hour meter), and the driving parts are not limited to the engine. The storage part 33 is constituted of a nonvolatile memory or the like, and is configured to store the accumulated operation time counted by the time counting part 34.

As shown in FIG. 1, the working machine 1 has a communication device 40. The communication device 40 is a device configured to output the data (the information) of the working machine 1 to the outside of the working machine 1 and to capture the external data to the working machine 1. The communication device 40 has a first communication part 41. The first communication part 41 is configured to be connected to the mobile terminal 50.

For example, the first communication part 41 can transmit, to the mobile terminal 50, a beacon of a communication scheme conforming to the Bluetooth (a registered trademark) Low Energy in the Bluetooth (a registered trademark) specification of the communication standard IEEE 802.15.1 series. The beacon transmitted by the first communication part 41 is iBeacon (a registered trademark), and the advertisement packet P1 is transmitted by the iBeacon.

Figure 2:
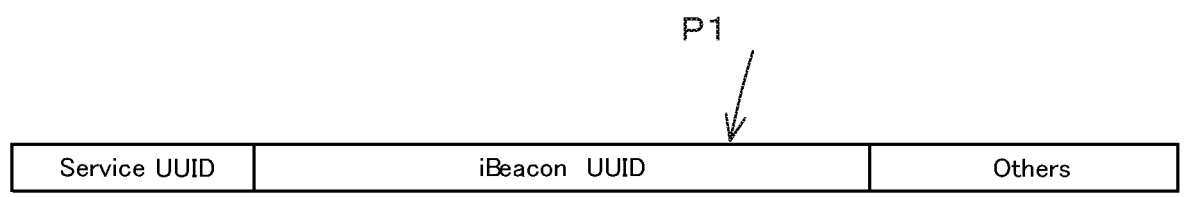
FIG. 2 is a schematic view illustrating an advertisement packet according to the embodiment.

As shown in FIG. 2, the advertisement packet P1 includes a service UUID (Service Universal Unique Identifier) and an iBeacon UUID unique to iBeacon.

In the iBeacon UUID, a first application identifier corresponding to the first application (a first application software) is set. In the service UUID, a second application identifier corresponding to the second application (a second application software) is set.

The first application is an activating application for activating the second application, and is a program different from the program of the operation system (OS). The first application identifier is an identifier constituted of information indicating the first application, and as shown in FIG. 3, the alphanumeric characters and the like are allocated thereto.

The second application is an application that processes the operation related to the working machine 1. In this embodiment, the second application is a collecting application for collecting the machine information of the working machine, a starting application for determining whether to start the driving part of the working machine, or the like.

The second application identifier is an identifier constituted of information indicating the second application, and as shown in FIG. 3, the alphanumeric characters or the like are allocated thereto.

The communication device 40 includes the collecting part 42 and the storage part (a storage device) 43. The collecting part 42 is composed of electric/electronic parts provided in the communication device 40, programs stored in the communication device 40, and the like. The collecting part 42 collects the machine information on the working machine.

In particular, the communication device 40, the control device 30 provided in the working machine 1, and the devices such as a sensor are connected by a communication line L1 or the like, and the collecting part 42 acquires the various signals (the various data) flowing in the communication line L1 as the machine information.

In particular, the collecting part 42 collects, as the machine information, the signals from various sensors, the cumulative operation time and the like under the situation where the controls such as the automatic idle control, the boom height control, the arm height control and the like are performed by the control device 30.

In the above-described embodiment, the signal and the cumulative operation information of the case where the control device 30 is performing the controls are employed as the machine information. However, the machine information to be collected by the collecting part 42 is not limited thereto. The collecting part 42 may collect the information on malfunction and warning of the devices mounted on the working machine 1 as the machine information, or may collect the setting values and the like of the devices of the working machine 1 as the machine information. Thus, any information on the working machine 1 can be employed.

The storage part 43 is constituted of a nonvolatile memory or the like, and temporarily stores the machine information collected by the collecting part 42. The machine information temporarily stored in the storage part 43, that is, the machine information collected by the collecting part 42 is transmitted to the mobile terminal 50 by the communication device 40 (the first communication part 41).

The communication device 40 has an identifier setting part 45. The identifier setting part 45 is constituted of electric/electronic parts provided in the communication device 40, programs stored in the communication device 40, and the like.

The identifier setting part 45 sets at least the second application identifier. For example, the identifier setting part 45 sets the second application identifier representing the collecting application in the service UUID in the case where the data capacity of the machine information (the untransmitted information) that has not been transmitted to the mobile terminal 50 among all the pieces of machine information (whole of the machine information) stored in the storage part 43 is equal to or larger than a predetermined value and where the mobile terminal 50 is requested to acquire the untransmitted information.

In addition, when requesting the mobile terminal 50 to transmit the first authentication information under the state where the prime mover E1 is not started, the identifier setting part 45 sets the second application identifier indicating the starting application in the service UUID. In addition, the identifier setting part 45 sets, to iBeacon UUID, the first application identifier corresponding to the first application.

The first communication part 41 transmits, to the mobile terminal 50, the beacon including the first application identifier and the second application identifier.

The mobile terminal 50 is a tablet terminal, a smartphone, a PDA, or the like and can be carried around. The mobile terminal 50 is configured to be connected to the communication device 40 provided in the working machine 1, and is configured to transmit and receive the various data (the various information) to and from the communication device 40. The mobile terminal 50 has the second communication part 51.

The second communication part 51 is composed of a communication module or the like for performing the short-range communication and the long-range communication, and performs the wireless communication with the communication device 40 in accordance with the Bluetooth (a registered trademark) Low Energy and the like in the specification of Bluetooth (a registered trademark) of the communication standard IEEE 802.15.1 series. Meanwhile, note that the second communication part may perform the wireless communication in the mobile phone communication network, the data communication network, or the like.

The mobile terminal 50 includes a storage part (a storage device) 52, a display part (a display device) 53, and a calculation part (a calculation device) 54. The storage part 52 is a nonvolatile memory, and stores the machine information received from the communication device 40, the various application software (the applications), an operation system (OS) such as iOS, and the like.

The storage part 52 stores a first application and a second application in addition to the operation system (OS). The number of the second applications stored in the storage part 52 is not limited, and the storage part 52 may store a plurality of second applications.

The display part 53 is capable of displaying the various information, and is composed of a liquid crystal panel or the like. The calculation part 54 is composed of a CPU, the electric/electronic parts and the like provided in the mobile terminal 50, and the calculation part 54 performs the various processes of the mobile terminal 50.

After the second communication part 51 receives the beacon including the first application identifier and the second application identifier, the calculation part 54 activates the first application corresponding to the first application identifier and executes the second application corresponding to the second application identifier.

Figure 4:
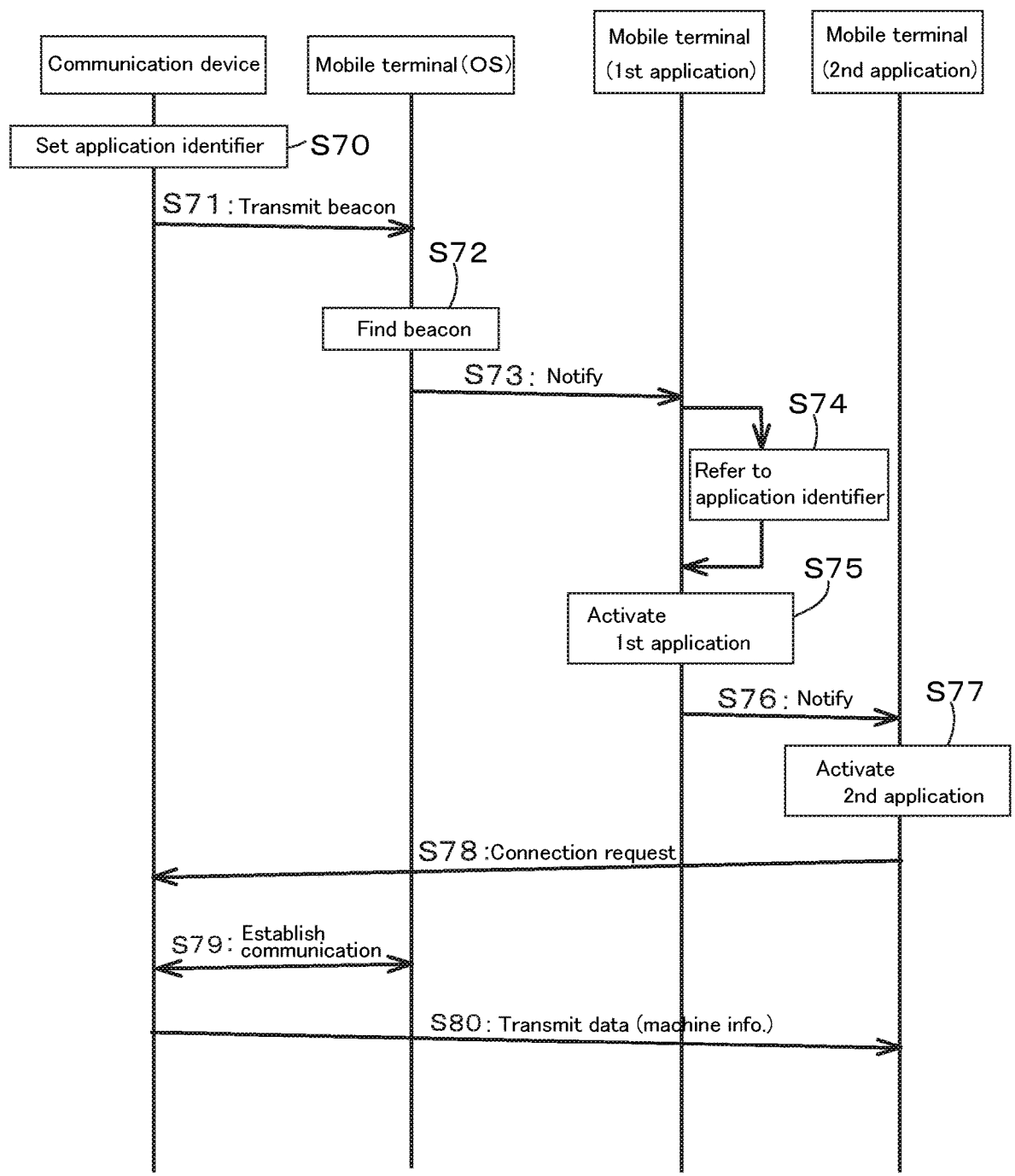
FIG. 4 is a flowchart showing a flow of connection between a communication device and a mobile terminal according to the embodiment.

FIG. 4 shows a flowchart of the connection between the communication device 40 and the mobile terminal 50. The communication device 40 and the mobile terminal 50 will be described in detail with reference to FIG. 4. In the second application, the second application identifier corresponding to the collecting application is referred to as a "collection identifier", and the second application identifier corresponding to the starting application is referred to as a "start identifier".

Under the state where the power from the battery or the like is supplied to the communication device 40, it is possible to transmit the beacon of the communication device 40 irregularly or periodically. For example, the power is supplied to the communication device 40 in either the OFF state or the ON state of the ignition switch of the working machine 1.

First, in the power supplying state, the identifier setting part 45 of the communication device 40 sets the application identifier as necessary (step S0: an identifier setting processing).

In the identifier setting processing S70, for example, in the case where the data capacity of untransmitted information that has not been transmitted to the mobile terminal 50 is equal to or greater than a predetermined value among all the machine information in the storage part 43, a collection identifier is added to the service UUID of the advertisement packet P1.

Meanwhile, in the above-described embodiment, the collection identifier is set when the data capacity of untransmitted information is equal to or larger than the predetermined value. However, the collection identifier is not limited to that, and the collection identifier may be set irregularly or periodically.

In the identifier setting processing S70, in the case where the engine is driven under the state where the engine is not started yet (the state in which the driving of the engine is stopped), the start identifier is set in the service UUID of the advertisement packet P1.

In addition, in the identifier setting processing S70, in order to activate (execute) the second application such as the collecting application and the starting application on the mobile terminal side, the first application identifier indicating the starting application is set to the iBeacon UUID.

Upon completion of setting of the first application identifier and the second application identifier, the communication device 40 transmits, to the outside, the beacon (the advertisement packet PI) including the first application identifier and the second application identifier (step S71).

That is, in step S71 of transmitting the beacon to the mobile terminal 50, the second application identifier for identifying either one of the collecting application and the starting application is transmitted.

In the case where the mobile terminal 50 is present in the communication area of the advertisement packet P1 (area in which the advertisement packet P1 can be received), the second communication part 51 receives the advertisement packet P1.

That is, when the second communication part 51 of the mobile terminal 50 receives the beacon (the advertisement packet P1), the operation system OS of the mobile terminal 50 being executed by the calculation part 54 finds the beacon (step S72).

The operation system OS notifies the application that the beacon has been found.

The mobile terminal 50 refers to the iBeacon UUID in the beacon (the advertisement packet P1) (step S74), and starts up (activates) the first application corresponding to the first application identifier in the case where the first application identifier is included (step S75).

After the activation, the first application refers to the service UUID in the beacon (the advertisement packet P1), that is, the second application identifier, and then notifies the second application corresponding to the second application identifier of that (step S76).

For example, in the case where the second application identifier is the collection identifier, the first application notifies the collecting application of that. In addition, in the case where the second application identifier is the start identifier, the first application notifies the starting application of that.

The second application activates the second application of itself by the notification from the first application (step S77).

For example, in the case where the notification is issued from the first application to the collecting application, the collecting application is activated. In addition, in the case where the notification is issued from the first application to the starting application, the starting application is activated.

The second application issues a connection request to the communication device 40 after the activations (step S78).

For example, in the case when the second application having been activated is the collecting application, the collecting application issues a connection request to the communication device 40. In the connection request S78, the mobile terminal 50 executes the connection to the communication device 40 with the collecting application.

On the other hand, in the case where the second application having been activated is the starting application, the starting application issues a connection request to the communication device 40.

In the connection request S78 by the starting application, the mobile terminal 50 executes the connection to the communication device 40 with the starting application.

That is, after the activation of both the collecting application and the starting application, the processing progresses to the connection processing by issuing the connection request to the communication device 40.

After the connection request by the second application, the processing is executed between the first communication part 41 of the communication device 40 and the second communication part 51 of the mobile terminal 50, and the bidirectional communication is established (step S79).

After the establishment of the communication between the communication device 40 and the mobile terminal 50, the second application issues, to the working machine 1, a request based on the processing of the second application. For example, in the case of the collecting application, the collecting application requests the communication device 40 to transmit the machine information corresponding to the collecting application.

That is, the mobile terminal 50 requests the transmission of the machine information with the collecting application.

Thereafter, the communication device 40 notifies (transmits) the collecting application of the machine information temporarily stored in the storage part 43, in response to a request for transmission of the machine information, the request being issued from the collecting application (step S80).

The collecting application stores, in the storage part 52, the machine information as the own data of the application.

On the other hand, in the case of the starting application, the starting application notifies the communication device 40 that it is possible to judge whether to start the engine.

In response to the availability of judging whether to start the engine notified from the starting application, the communication device 40 requests the starting application to transmit the first authentication information.

When the mobile terminal 50 receives the request for transmitting the first authentication information, the starting application executes a process of transmitting, to the communication device 40, the first authentication information stored in the storage part 43.

The control device 30 of the working machine 1 allows the start of the engine when the authentication between the first authentication information transmitted from the outside such as the mobile terminal 50 and the second authentication information registered in advance is established, and then the engine starts to be driven.

In addition, in the case where the authentication between the first authentication information and the second authentication information is not established, the control device 30 of the working machine 1 does not permit the start of the engine and thus does not start the engine.

As described above, in the case of the starting application, the mobile terminal 50 transmits the first authentication information for judging whether or not to start the working machine with the starting application.

In the embodiment described above, the identifier setting part 45 sets the collection identifier for identifying the collecting application in the case where the data capacity of the untransmitted information that has not been transmitted to the mobile terminal 50 is equal to or more than a predetermined value. However, in the case where there is at least data to be transmitted to the mobile terminal 50, the collection identifier may be set.

In the embodiment described above, the collecting application and the starting application are exemplified as the application, but the application is not limited thereto. For example, the application may be a notification application that notifies the mobile terminal 50 of the notification information such as the warning of the working machine.

The identifier setting part 45 sets an application identifier corresponding to the notification application as the second application identifier.

The notification application, which is the second application, is activated after the notification of the first application.

Then, the notification application issues a connection request to the communication device 40, and establishes the communication between the communication device 40 and the mobile terminal 50.

After establishing the communication between the communication device 40 and the mobile terminal 50, the communication device 40 transmits the notification information such as the warning for the notification application of the mobile terminal 50.

After receiving the notification information, the mobile terminal 50 displays the notification information transmitted from the working machine (the communication device 40).

In this manner, the working machine transmits the notification identifier to the mobile terminal 50 in the case where there is some information to be informed to the mobile terminal 50, and thereby displaying the warning or the like on the mobile terminal 50.

In addition, the number of the second applications is not limited to the above example, and may be two or more, three or more, or further more.

As described above, the communication system for the working machine includes the communication device 40 provided in the working machine, and the mobile terminal 50 that can be connected to the communication device 40 and has the first application and the second application. The communication device 40 includes a first communication part 41 that transmits, to the mobile terminal 50, the beacon including the first application identifier corresponding to the first application and the second application identifier corresponding to the second application. The mobile terminal 50 includes the calculation part 54 that executes the second application corresponding to the second application identifier after activating the first application corresponding to the first application identifier.

According to this, by transmitting the first application identifier from the communication device 40 to the mobile terminal 50, the mobile terminal side activates the first application with the reception of the first application identifier as a trigger, and after the activation of the first application, various types of the second applications corresponding to the second application identifier can be executed.

The second application is either one of the collecting application for collecting the machine information of the work machine 1 and the starting application for judging whether to start the work machine 1.

In this manner, the machine information of the working machine 1 can be collected, and the working machine 1 can be started.

The collecting application executes the connection to the communication device 40, and requests the transmission of the machine information.

In this manner, the mobile terminal 50 and the communication device 40 can be connected to each other by the collecting application, and the machine information can be obtained after the connection or the like.

The starting application executes the connection to the communication device 40 and transmits the authentication information for judging whether or not the work machine 1 is to be started.

In this manner, the mobile terminal 50 and the communication device 40 can be connected to each other by the starting application, and the working machine 1 can be started after the connection or the like.

The communication device 40 for the working machine 1 is a communication device for the working machine configured to be connected to the mobile terminal 50, the mobile terminal 50 having at least the first application and the second application. In addition, the communication device 40 includes the first communication part 41 that transmits, to the mobile terminal 50, the beacon including the first application identifier corresponding to the first application and the second application identifier corresponding to the second application.

According to that, the first application identifier can be transmitted from the communication device 40 to the mobile terminal 50. The mobile terminal side can activate the first application with the reception of the first application identifier as a trigger, and can execute various types of the second application corresponding to the second application identifier after the first application is activated.

The communication device 40 transmits, to the mobile terminal 50, the data corresponding to the second application requested by the mobile terminal 50 after the mobile terminal 50 has received the beacon and further after the first application is activated.

In this manner, the communication device 40 can easily transmit, to the mobile terminal 50, the data corresponding to the second application.

The mobile terminal 50 has at least the first application and the second application, and is a mobile terminal configured to be connected to the communication device 40 provided in the working machine 1. Furthermore, the mobile terminal 50 includes the calculation part 54 configured to execute the activation of the second application corresponding to the second application identifier after receiving the first application identifier and the second application identifier transmitted from the communication device 40 further after activating the first application.

In this manner, after receiving the first application identifier transmitted by the communication device 40, the mobile terminal 50 can activate the first application with the reception of the first application identifier as a trigger. Further, the mobile terminal 50 can execute various types of the second applications corresponding to the second application identifier after activating the first application.

The mobile terminal 50 has the storage part 52 configured to store the second application including the collecting application for collecting the machine information of the working machine 1 and the starting application for judging whether to start the working machine 1. In this manner, the mobile terminal 50 can obtain the machine information of the working machine 1 or start the working machine 1.

The mobile terminal 50 executes the connection to the communication device 40 and requests the transmission of the machine information, with the collecting application. In this manner, the mobile terminal 50 and the communication device 40 can be connected to each other by the collecting application, and the machine information can be acquired after the connection or the like.

The mobile terminal 50 executes the connection to the communication device 40 and transmits the authentication information for judging whether or not the work machine 1 is to be started, with the starting application. In this manner, the mobile terminal 50 and the communication device 40 can be connected to each other by the starting application, and the working machine 1 can be started after the connection or the like.

The communication processing method for the working machine 1 is a communication processing method for connecting the communication device 40 provided in the working machine 1 to the mobile terminal 50 being configured to be connected to the communication device 40 and having at least the first application and the second application. The communication processing method for the working machine 1 includes a step of transmitting, by the communication device 40, the beacon including the first application identifier corresponding to the first application and the second application identifier corresponding to the second application, a step of activating, by the terminal 50, the first application corresponding to the first application identifier after receiving the beacon, and a step of executing the second application corresponding to the second application identifier after activating the first application.

In this manner, the mobile terminal side can activate the first application with the reception of the first application identifier as a trigger in accordance with the first application identifier transmitted from the communication device 40 to the mobile terminal 50, and can execute various types of the second applications corresponding to the second application identifier after the first application is activated.

In the step of transmitting the beacon to the mobile terminal 50, the second application identifier is transmitted, the second application identifier identifying either one of the collecting application for collecting the machine information of the working machine 1 and the starting application for judging whether to start the working machine 1. In this manner, the mobile terminal 50 can acquire the machine information of the working machine 1 and can start the working machine 1.

The communication processing method for the working machine 1 includes a step of executing, by the mobile terminal 50, the connection to the communication device 40 with the collecting application, and a step of requesting, the mobile terminal 50, the transmission of the machine information with the collecting application. In this manner, the mobile terminal 50 and the communication device 40 can be connected to each other by the collecting application, and the machine information can be acquired after the connection or the like.

The communication processing method for the working machine 1 includes a step of executing, by the mobile terminal 50, the connection to the communication device 40 with the starting application, and a step of transmitting, by the mobile terminal 50, the authentication information for judging whether to allow the start of the working machine 1 with the starting application. In this manner, the mobile terminal 50 and the communication device 40 can be connected to each other by the starting application, and it is possible to judge whether to allow the start of the working machine 1 with the authentication information after the connection or the like.

In the above description, the embodiment of the present invention has been explained. However, all the features of the embodiment disclosed in this application should be considered just as examples, and the embodiment does not restrict the present invention accordingly. A scope of the present invention is shown not in the above-described embodiment but in claims, and is intended to include all modifications within and equivalent to a scope of the claims.

What is claimed is:

1. A communication device for a working machine to be communicated with a mobile terminal,
the communication device comprising:
a first communication circuitry to send a beacon including a first application identifier corresponding to a first application and a second application identifier corresponding to a second application that processes an operation related to the working machine; and
an identifier setting circuitry to set the second application identifier in the beacon,
the mobile terminal comprising:
a processing unit configured to
activate the first application by an operation system of the processing unit when the first application identifier is found in the beacon sent from the first communication circuitry,
refer the beacon to provide notification as a trigger of activation of the second application with the second application by the first application when the second application identifier is included in the beacon, and
activate the second application when the second application receives the notification from the first application; and
a second communication circuitry configured to communicate with the first communication circuitry of the communication device with a connection request issued by the second application,
wherein the identifier setting circuitry sets the second application identifier in the beacon, which corresponds to the second application that collects the machine information, when data amount of the machine information which has not been sent from the first communication circuitry to the second communication circuitry is equal to or greater than a predetermined value.

2. The communication device according to claim 1, further comprising:
a collecting circuitry to collect machine information of the working machine; and
a storage to store the machine information collected by the collecting circuitry,
wherein the first communication circuitry is configured to send the machine information stored in the storage to the second application upon receiving the connection request from the second application.

3. The communication device according to claim 1,
wherein the identifier setting circuitry sets the second application identifier in the beacon, which corresponds to the second application that permits the mobile terminal to start a driving part of the working machine, when the driving part remains still and an authentication information is requested from the mobile terminal.

4. A mobile terminal to be communicated with a communication device on a working machine,
the communication device comprising:
a first communication circuitry to send a beacon including a first application identifier corresponding to a first application and a second application identifier corresponding to a second application that processes an operation related to the working machine; and
an identifier setting circuitry to set the second application identifier in the beacon, the mobile terminal comprising:
a processing unit configured to
activate the first application by an operation system of the processing unit when the first application identifier is found in the beacon sent from the first communication circuitry,
refer the beacon to provide notification as a trigger of activation of the second application with the second application by the first application when the second application identifier is included in the beacon, and
activate the second application when the second application receives the notification from the first application; and
a second communication circuitry configured to communicate with the first communication circuitry of the communication device with a connection request issued by the second application,
wherein the identifier setting circuitry sets the second application identifier in the beacon, which corresponds to the second application that collects the machine information, when data amount of the machine information which has not been sent from the first communication circuitry to the second communication circuitry is equal to or greater than a predetermined value.

5. The mobile terminal according to claim 4,
the communication device further comprising:

a collecting circuitry to collect machine information of the working machine; and a storage to store the machine information collected by the collecting circuitry, and wherein the first communication circuitry is configured to send the machine information stored in the storage to the second application upon receiving the connection request from the second application.

6. The mobile terminal according to claim 4, wherein the identifier setting circuitry sets the second application identifier in the beacon, which corresponds to the second application that permits the mobile terminal to start a driving part of the working machine, when the driving part remains still and an authentication information is requested from the communication device.

7. A communication system including a communication device for a working machine and a mobile terminal, the communication device comprising:

a first communication circuitry to send a beacon including a first application identifier corresponding to a first application and a second application identifier corresponding to a second application that processes an operation related to the working machine; and an identifier setting circuitry to set the second application identifier in the beacon, and the mobile terminal comprising:

a processing unit configured to activate the first application by an operation system of the processing unit when the first application identifier is found in the beacon sent from the first communication circuitry, refer the beacon to provide notification as a trigger of activation of the second application with the second application by the first application when the second application identifier is included in the beacon, and activate the second application when the second application receives the notification from the first application; and a second communication circuitry configured to communicate with the first communication circuitry of the communication device with a connection request issued by the second application, wherein the identifier setting circuitry sets the second application identifier in the beacon, which corresponds to the second application that collects the machine information, when data amount of the machine information which has not been sent from the first communication circuitry to the second communication circuitry is equal to or greater than a predetermined value.

8. The communication system according to claim 7, the communication device further comprising:

a collecting circuitry to collect machine information of the working machine; and a storage to store the machine information collected by the collecting circuitry, wherein the first communication circuitry is configured to send the machine information stored in the storage to the second application upon receiving the connection request from the second application.

9. The communication system according to claim 7, wherein the identifier setting circuitry sets the second application identifier in the beacon, which corresponds to the second application that permits the mobile terminal to start a driving part of the working machine, when the driving part remains still and an authentication information is requested from the communication device.

10. A communication processing method for a working machine, comprising:

sending a beacon from a communication device on the working machine to a mobile terminal, the beacon including a first application identifier corresponding to a first application and a second application identifier corresponding to a second application that processes an operation related to the working machine;

setting the second application identifier in the beacon;

activating the first application when the first application identifier is found in the beacon sent from the communication device;

referring the beacon to provide notification as a trigger of activation of the second application with the second application by the first application when the second application identifier is included in the beacon;

activating the second application when the second application receives the notification from the first application; and establishing a communication between the communication device and the mobile terminal when a connection request is issued by the second application, wherein the second application identifier is set in the beacon, which corresponds to the second application that collects the machine information, when data amount of the machine information which has not been sent from the communication device to the mobile terminal is equal to or greater than a predetermined value.

11. The communication processing method according to claim 10, further comprising:

collecting machine information of the working machine; and storing the machine information in the communication device, wherein the communication device is configured to send the machine information stored therein to the second application upon receiving the connection request from the second application.

12. The communication processing method according to claim 10, wherein the second application identifier is set in the beacon, which corresponds to the second application that permits the mobile terminal to start a driving part of the working machine, when the driving part remains still and an authentication information is requested from the communication device.

* * * * *